April 6, 1965   F. DURAND   3,176,533
DEVICE FOR DRIVING LARGE-SIZED GEAR RINGS
Filed April 11, 1962   8 Sheets-Sheet 1
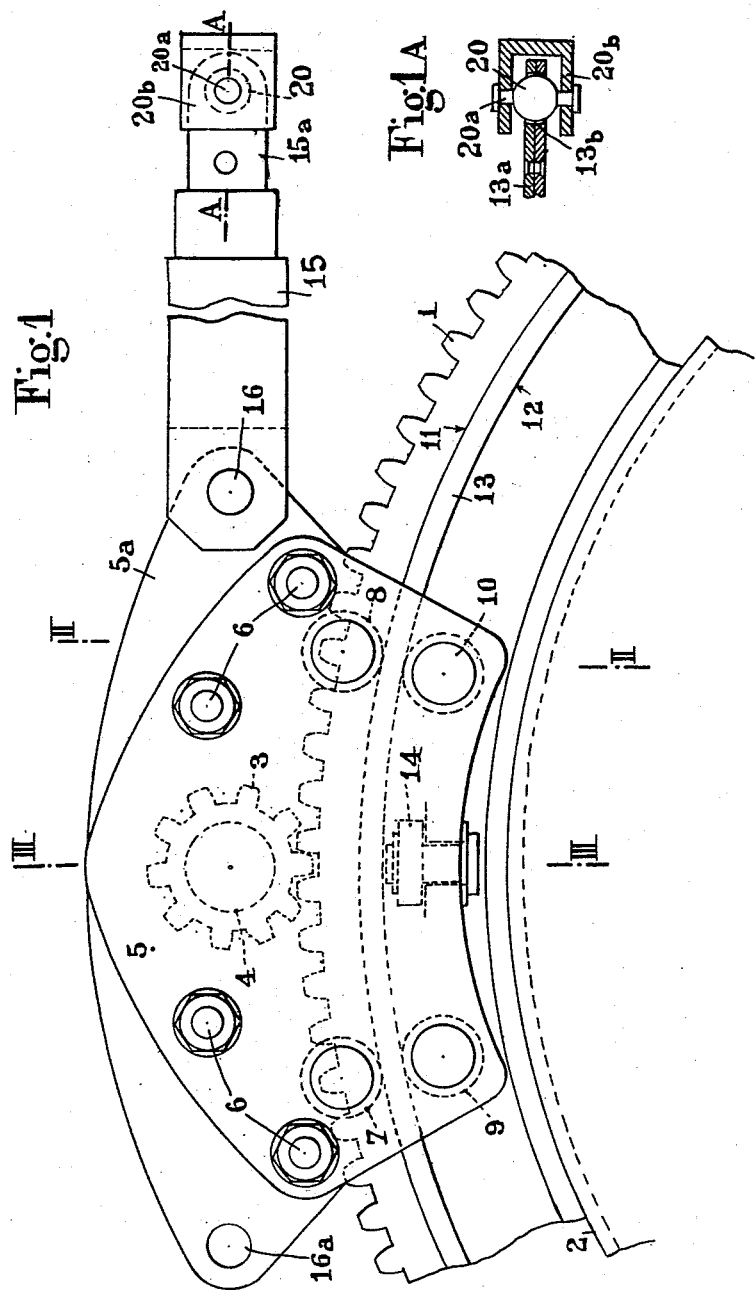
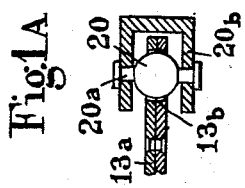
INVENTOR.
FRANCOIS DURAND

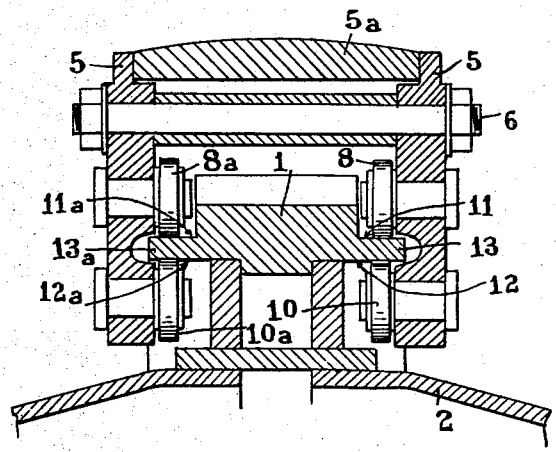
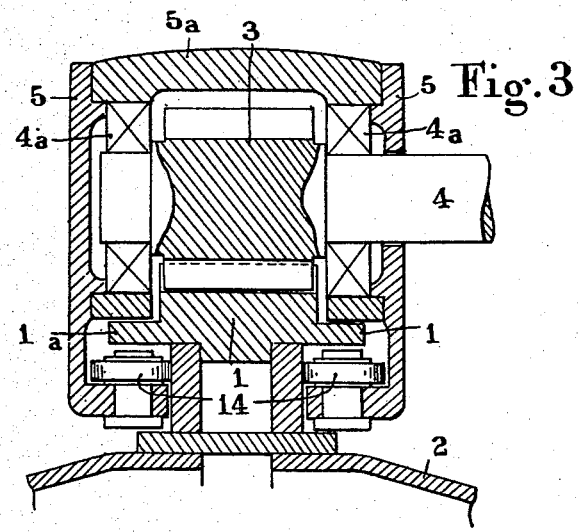

April 6, 1965     F. DURAND     3,176,533
DEVICE FOR DRIVING LARGE-SIZED GEAR RINGS
Filed April 11, 1962     8 Sheets-Sheet 4

Inventor:
François Durand by:
Michael S. Striker
Attorney

April 6, 1965    F. DURAND    3,176,533
DEVICE FOR DRIVING LARGE-SIZED GEAR RINGS
Filed April 11, 1962    8 Sheets-Sheet 6
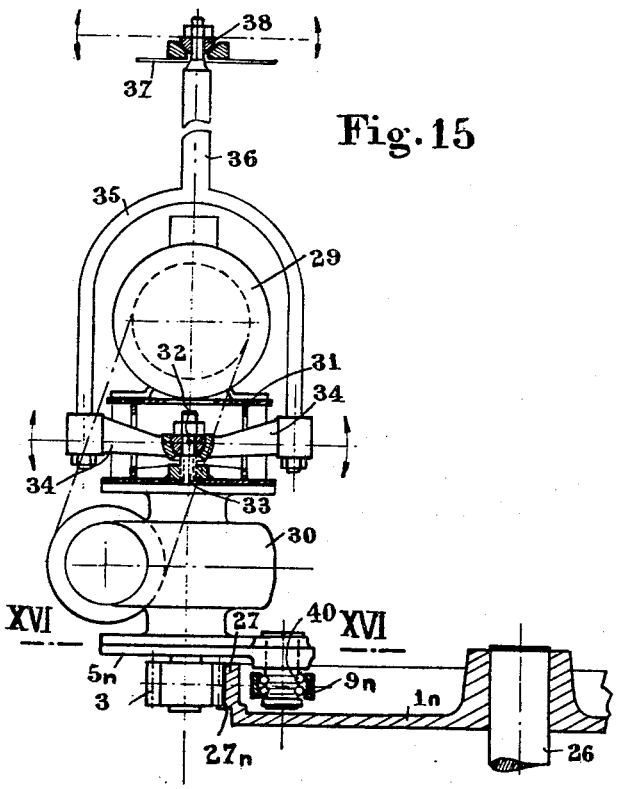
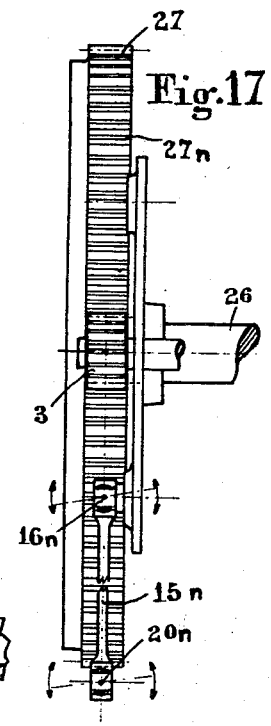
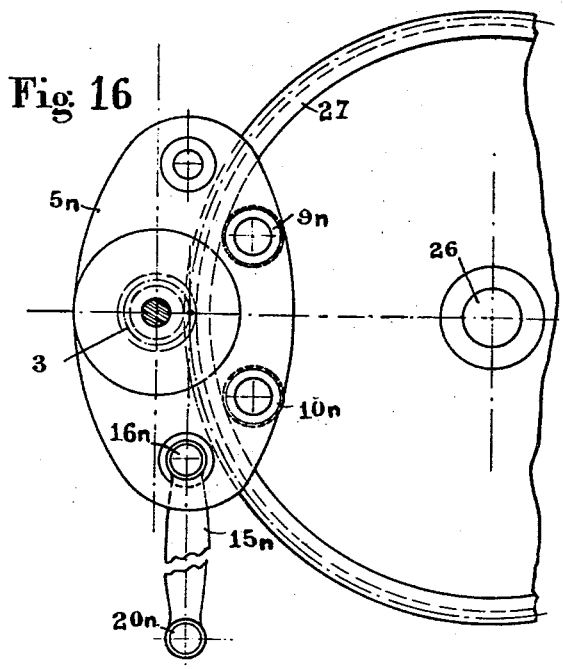
Inventor:
François Durand
by:
Michael S. Striker
Attorney April 6, 1965  F. DURAND  3,176,533
DEVICE FOR DRIVING LARGE-SIZED GEAR RINGS
Filed April 11, 1962  8 Sheets-Sheet 7
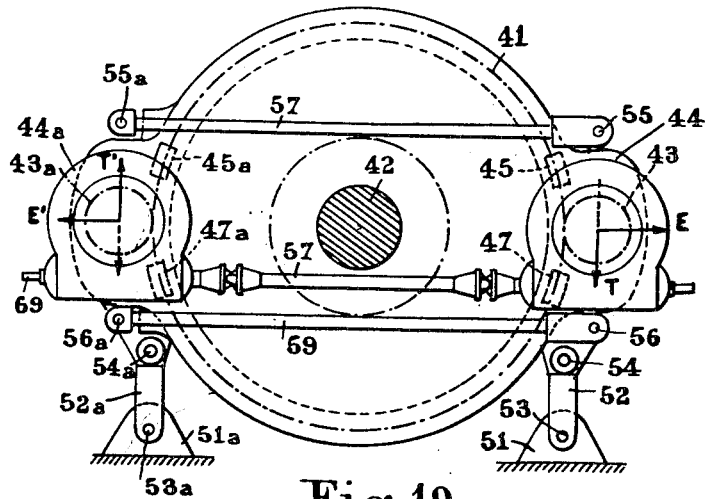
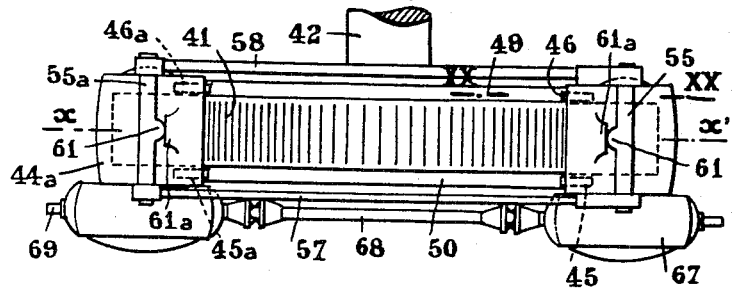
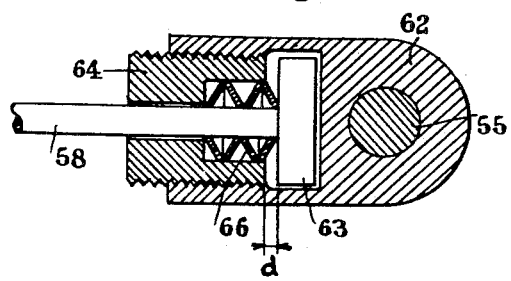
Inventor:
François Durand
by:
Michael S. Striker
Attorney April 6, 1965  F. DURAND  3,176,533
DEVICE FOR DRIVING LARGE-SIZED GEAR RINGS
Filed April 11, 1962  8 Sheets-Sheet 8
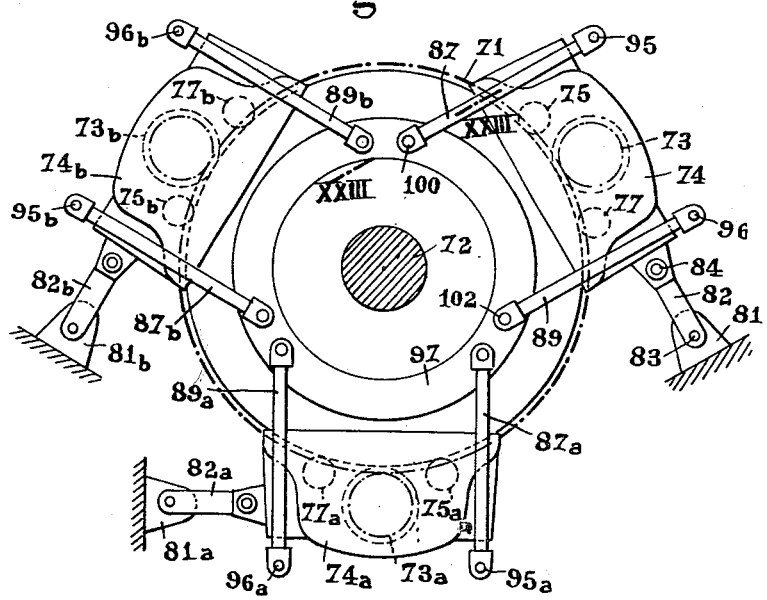
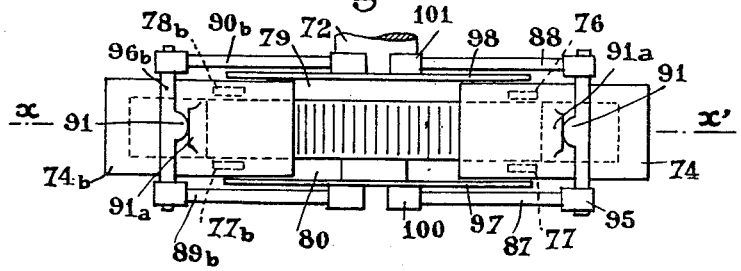

United States Patent Office 3,176,533
Patented Apr. 6, 1965

3,176,533
DEVICE FOR DRIVING LARGE-SIZED
GEAR RINGS
François Durand, 109 Boulevard Carnot,
Le Vesinet, France
Filed Apr. 11, 1962, Ser. No. 186,789
Claims priority, application France, Jan. 27, 1959, 785,050,
Patent 1,230,485; June 2, 1960, 828,876, Patent 77,826,
1st Add. to Patent 1,230,485; Nov. 18, 1961, 879,405,
Patent 1,322,828
14 Claims. (Cl. 74—421)

This invention relates to devices for driving large-sized gear rings, for example, a toothed annulus associated with an installation to be driven at relatively low speed, such as a swivelling crane, a rotary kiln or any other slow-rotating installation.

This invention aims at providing a proper meshing engagement between the driving pinion and the driven gear ring. In this respect, the requirements to be met in order to ensure a proper meshing engagement between a driving pinion and a toothed gear ring of the involute of a circle type are well known, these requirements being as follows:

(I) The theoretical axes of the teeth portions in relative meshing engagement should form a plane;
(II) These axes should be parallel in this plane;
(III) The relative spacing of these axes may vary within limits consistent with the variation in the meshing plays.

Now different causes may prevent these requirements from being normally met. Thus, the gear ring may be warped or more or less out of truth. On the other hand, the gear ring teeth may have such defects that the pinion teeth engage only the edges thereof, whereby the loads to be transmitted would be applied to only one fraction of the teeth width.

Therefore, it is the object of this invention to provide a transmission device adapted automatically to meet the different requirements necessary for ensuring a proper meshing engagement between the driving pinion and the gear ring even if the gear ring is defective, for instance as set forth in the preceding paragraph.

To this end, this invention provides a driving device comprising a driving pinion in constant meshing engagement with the gear ring to be driven, said pinion being carried by a rocking support carrying rollers engaging at least one guide rib concentric with the gear ring teeth. This device is characterized in that the pinion support consists of a separate trolley or like carrier equipped with relatively close-spaced rollers disposed on either side of the common meshing plane of the pinion and ring, and that it comprises a rod for holding the trolley against motion in the tangent direction, this rod being pivoted at either ends on said trolley and at a fixed location, preferably through the medium of universal joints, or at least of joints affording a certain freedom of movement in all directions.

Thus, this devices ensures an efficient and proper relative meshing engagement of the pinion and gear ring by meeting automatically the requirements therefor. In fact, in this device, the driving pinion is carried by a trolley or like support guided and carried by the very periphery of the driven ring, so that this trolley may follow any out-of-truth or warped gear ring. The orientation of this trolley may also vary sufficiently by rotating about the pivotal attachment to the anchor rod and owing to the rotation of the rod itself about its fixed pivot point, whereby the pinion teeth may engage with their entire surface the gear ring teeth, even if these teeth are defective. Thus, this device imparts to the driving pinion a certain freedom of movement in relation to fixed points, whereby its orientation can be modified as a function of any defect in the gear ring or its teeth, so that the meshing engagement between the pinion and the gear ring will always take place under the best possible conditions.

A few typical embodiments of the transmission device of this invention will now be described by way of example with reference to the accompanying drawings, wherein:

FIGURE 1 is a fragmentary plane view from above of a driving device constructed according to the teachings of this invention;

FIGURE 1A is a fragmentary section taken upon the line A—A of FIG. 1 to illustrate a detail of the device;

FIGURES 2 and 3 are fragmentary sections taken upon the lines II—II and III—III of FIG. 1, respectively;

Figure 4:
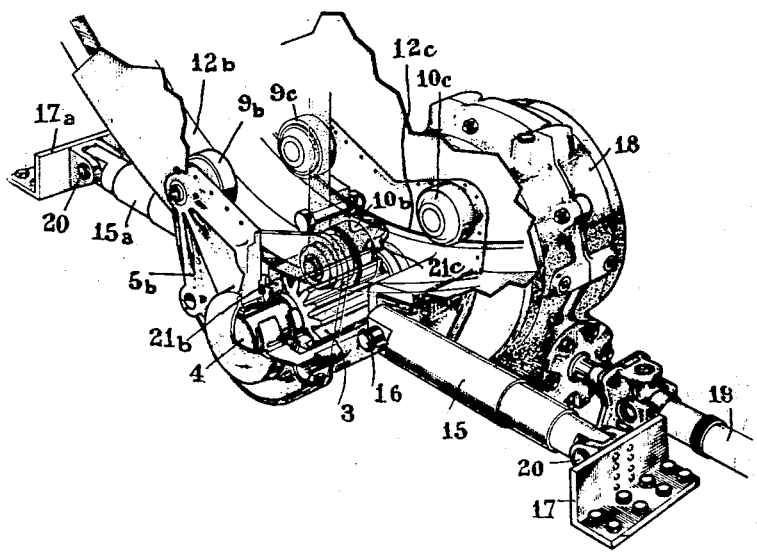
FIGURE 4 is a perspective view showing an alternate form of embodiment of the driving arrangement with a "floating" reducing gear mounted directly on one end of the shaft of the driving pinion.

FIGURES 6A to 11A, on the one hand, and FIGS. 6B to 11B, on the other hand, are diagrammatic fragmentary elevational views or sectional and elevational views showing different forms of embodiment as seen from the inner side and from the outer side of the gear ring respectively;

FIGURES 12A to 14A on the one hand, and FIGS. 12B to 14B on the other hand, are diagrammatic fragmentary views namely plane views from above and sectional elevations as seen from the outer side, respectively, of different other forms of embodiment;

FIGURE 15 is a view partly in elevation and partly in vertical section illustrating another form of embodiment;

FIGURE 16 is a horizontal section taken upon the line XVI—XVI of FIG. 15;

FIGURE 17 is a fragmentary side elevational view of the same embodiment;

FIGURE 18 is a plane view illustrating a typical embodiment wherein the device comprises two driving pinions;

FIGURE 19 is a side elevational view of the device shown in FIG. 18;

FIGURE 20 is a fragmentary section taken upon the line XX—XX of FIG. 19;

FIGURES 21 and 22 are views similar to FIGS. 18 and 19 respectively but illustrating another form of embodiment wherein the device comprising three driving pinions; and FIGURE 23 is a fragmentary section taken upon the line XXIII—XXIII of FIG. 21.

The driving device illustrated in FIGS. 1 to 3 of the drawings is associated with a large-diameter gear ring or toothed annulus 1 carried by the outer peripheral portion of a member or apparatus 2 to be driven at low rotational speed. The member by which this gear ring is to be driven is a pinion 3 carried by a driving shaft 4 driven in turn through any suitable means, for example, a worm and gear reducing mechanism (not shown), a universal or like joint being interposed in the transmission.

According to this invention, the pinion 3 is mounted in a trolley consisting of a pair of plates 5 assembled by means of distance-pieces 6 and a transverse wall member 5a, a ball- or roller-bearings 4a being interposed between the shaft 4 and the trolley, as shown. The plates 5 are disposed on either side of the toothed annulus 1 and carry four pairs of rollers disposed the ones 7, 8, 9 and 10 on the inner face of one plate and the others 7a, 8a, 9a, and 10a on the inner face of the other plate.

These rollers engage four tracks 11, 12, 11a, 12a consisting of the outer and inner surfaces of a pair of circular ribs 13, 13a rigid with the gear ring and concentric to its teeth. The two tracks 11 and 11a are directed outwards and the other tracks 12 and 12a are directed toward the center of the gear ring. The two sets of tracks 11, 12 on the one hand and 11a, 12a on the other hand are disposed symmetrically on either side of the mesial plane of the gear ring.

The rollers engaging these tracks are divided into two groups of two pairs each, these two groups being disposed on either side of the line III—III corresponding to the mesial plane of the meshing engagement between the pinion and gear ring, this plane containing more particularly the pinion axis and the gear ring axis. The rollers 7, 8, 7a and 8a engage the outer tracks 11, 11a and the rollers 9, 10, 9a and 10a engage the inner tracks 12, 12a. It is this last set of rollers that prevents the pinion 3 and trolley 5 from moving away from the gear ring under the influence of stress resulting from their relative engagement. The four rollers 7, 8, 9 and 10 are disposed on one side of the gear ring and the other rollers 7a, 8a, 9a and 10a are disposed on the opposite side of the gear ring.

Thus, as a result of the co-operation between the rollers and the guide tracks carried by the gear ring, the trolley 5 is properly held on the periphery of the gear ring. By construction, the teeth of pinion 3 are thus kept in accurate meshing engagement with the teeth of the gear ring and the line of centers is maintained at the desired value.

A rod for holding the trolley 5 against movement in the tangential direction is attached to the trolley. This rod consists preferably of a damping arm 15 pivoted on a fixed point 20b and also on a pin 16 carried by the trolley 5. This arm 15 comprises two telescopic elements 15 and 15a having interposed therebetween a spring or other resilient means. The pivots 16 and 20 of arm 15 are preferably of the universal type and consist for example of ball-and-socket joints in order to impart to the trolley 5 a certain freedom of movement in all directions.

FIG. 1A illustrates a typical embodiment of this joint, which comprises a ball 20 rigid with a transverse trunnion 20a carried by a strap consisting of a stationary member 20b which may be solid with the frame structure of the installation. The end of the corresponding portion 13a is formed with an aperture having part-spherical walls engaged by the ball 20 whereby the arm 15 may pivot to a substantial degree in all directions about the center of this ball.

The pivot point or points of the damping arms are preferably so located that the axis of each damping device is substantially coincident with the transverse mesial plane of the driving pinion.

Due to its specific mounting, the trolley 5 ensures a proper meshing engagement between the pinion 3 and the gear ring 1 even in case of defects likely to interfere normally with the obtaining of the conditions necessary for ensuring a proper relative meshing engagement.

If the set of teeth of the driven gear ring is out of truth at one or more places, the trolley may accommodate these defects by following the contour of the periphery of the gear ring by moving more or less away from its initial position, the arm 15 pivoting about the fixed pivot 20 as the trolley 5 pivots about the pin 16 carried by this arm. Thus the pinion teeth are constantly kept in proper meshing engagement with the gear ring teeth, the rollers 7, 8, 9, 10 and 7a, 8a, 9a and 10a absorbing the reaction torques resulting from the displacements of the axis of arm 15.

If the gear ring is out of truth or if its shaft is slightly inclined, torque reactions are transmitted to the trolley as a consequence of the relative engagement between the pinion and gear ring, these reactions tending to move the trolley so that all the pinion teeth engage with their whole surface the gear ring teeth. Due to these reactions, the trolley moves upwards or downwards in relation to its initial position by causing the arm 15 to pivot in relation to the fixed pin 20, the trolley pivoting on the other hand about the pin 16. Thus, the trolley 5 will take automatically the proper position to ensure a proper meshing engagement between the pinion and gear ring in spit of the warping of the gear ring or the inclination of its shaft.

If the gear ring teeth have defects or are not exactly parallel to the pinion teeth, the same automatic adjustment will take place. In fact, reactions also take place which tend to move and pivot the trolley 5 to cause the pinion teeth to engage with their entire surface the gear ring teeth. Thus the trolley may take a different inclination by pivoting about the pin 16, and at the same time it may move downwards or upwards, the arm 15 pivoting about the point 20.

As a rule, the trolley 5 can move and pivot in all directions in relation to the fixed points of the installation, so that the teeth of pinion 3 will constantly engage the gear ring teeth throughout their surface.

The trolley will place itself automatically in the most convenient position for properly distributing the load throughout the width of the teeth. This arrangement will prevent the teeth from bearing against one another at their corners and thus cause excessive overloads to be applied locally. The pivoting of the trolley about itself for ensuring the best possible relative engagement between the pinion teeth and the gear ring teeth involves only a minor change (which can easily be calculated) in the load distribution applied to the teeth and to the guide rollers of the trolley, without producing abnormal overloads in the teeth, while maintaining the contact throughout the teeth width.

This is a particularly advantageous feature for it may happen that the teeth of the gear ring 1 or pinion 2 be not strictly parallel. This not uncommon defect in the manufacture or machining of the teeth may have rather serious consequences in conventional reducing gears because it reduces considerably the width of the area by which the pinion teeth engage the gear ring teeth so as to create excessive local overloads. With the device of this invention the teeth engage one another throughout their width irrespective of their more or less pronounced want of parallelism, for these defects are compensated and absorbed automatically due to the possibility for the trolley to pivot slightly about itself.

This freedom of movement of the trolley, which constitutes an essential feature of the device of this invention, results from the fact that its connection with the fixed point 20 is not obtained directly but through the arm 15 pivoted at either ends. This freedom of movement is also due to the fact that the joints 16 and 20 are universal joints. If desired, simple pivot pins having a certain play affording a sufficient freedom of movement of the trolley in different planes may be substituted for these joints.

Due to the provision of this damping arm, transmission shocks are safely absorbed as the trolley 5 can effect low-amplitude movements with the pinion 3 while the damping arm performs its function. This arm may comprise a dynamometric stop-motion device adapted to stop the operation of the machine or device in case of abnormal shocks or overloads. If desired, another damping arm of the same type may be mounted on the opposite end 16a of the trolley.

A pair of additional rollers 14 may be provided in the trolley 5; these additional rollers 14 are mounted for rotation about axes perpendicular to those of the aforesaid guide rollers and carried by the in-turned inner edges of plates 5, as shown in FIG. 3. These rollers 14 are in rolling engagement with the two relevant faces of the gear ring rim, so as to hold the trolley 5 in position in the axial direction of the driving shaft 4.

In order to prevent the trolley 5 from rearing under the loads applied thereto, the assembly will be so designed as to cause the line of force of the damping arm to create in the trolley a reaction torque equal and opposite to the reaction torques created by the pinion driving device. More particularly, when this pinion is driven from a primary "floating" reducing gear mounted on the stub shaft of this driving pinion 3, the axis of the fulcrum pin or like joint 16 of damping arm 15 will be so positioned that under normal operating conditions the line of force of the damping arm will intersect the line of contact of the pitch circles of the pinion and gear assembly. Thus, a reaction torque will be created which will compensate the low-speed reaction torque of the primary reducing gear.

When the pinion 3 is driven from a balanced coupling sleeve the fulcrum 16 of arm 15 will be so positioned that under normal operating conditions the line of force of the damping arm intersects the pinion axis.

It may be noted that when the efforts are reversed, that is, when the gear ring 1 drives the pinion 3, for example in case of a brake application, the direction of application of the stress and torques is reversed but the reaction torque balance is not destroyed.

On the other hand, when the direction of rotation is reversed the direction of application of the stress and torques is also inverted, without however impairing the balance of the reaction torques.

FIGURE 4 is a perspective view showing an alternate form of embodiment of the trolley transmission device of this invention. In this application the trolley or bogie 5b is connected to a pair of opposite fixed points 17, 17a through damping arms 15, 15a respectively, these arms being pivoted on the trolley at 16 and on the fixed points at 20. A reducing gear 18 is interposed between the power shaft 19 and the gear driving pinion 3, by being mounted as a "floating" unit on the pinion shaft 4.

The trolley 5b comprises only four guide rollers mounted two, 9b, 10b, on one face and the other two, 9c, 10c, on the other face. These rollers correspond somewhat to the rollers 9, 10, 9a, 10a provided in the preceding example on that side of trolley 5 which faces the center of the gear ring, the rollers previously provided on the outer side being eliminated. These rollers are urged against the corresponding tracks by the stress tending to move the pinion away from the gear ring as a consequence of their relative meshing engagement.

Moreover, the arrangement may comprise on the outer side a pair of rollers disposed in the plane passing through the gear ring axis and the pinion axis. These two rollers 21b, 21c are coaxial to the driving pinion 3. These rollers are effective through their beads to hold the trolley 5b in the proper axial position by preventing any relative tilting of the trolley when the latter is stationary, under the influence of the weight of the reducing gear 18, for this tilting movement would move the rollers 9b and 10b away from the race 11b and cause the pinion teeth to engage the bottom of the intervals between the teeth of the gear ring.

Figure 5:
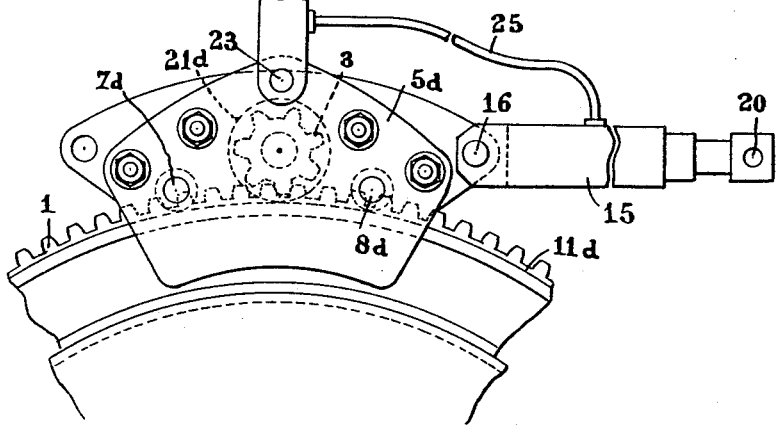
FIGURE 5 is a fragmentary plane view from above showing another alternate form of embodiment of this device.

FIGURE 5 illustrates another modified embodiment of the device illustrated in FIGS. 1 to 3. In this alternate embodiment only the outer side of the trolley 5d is provided with rollers, these rollers engaging a pair of guide tracks 11d concentric with the external teeth of the gear ring and being disposed on either side of the plane of the gear ring.

Thus, on one side the trolley 5d carries two rollers 7d, 8d engaging the corresponding track 11d, these rollers being disposed on either side of the mesial plane of meshing engagement of the pinion and gear ring.

On its other face the trolley may comprise two similar rollers or, as in the example illustrated, a single roller 21d in its central region. This last-named roller may be mouted on the shaft 4 of pinion 3, its diameter being such as to enable it to engage the corresponding guide rib (not visible in the drawings).

In this alternate embodiment there is provided not only a holding and damping arm 15 pivotally mounted at 16 on the trolley and at 20 on a fixed point, but also another damping arm 22 pivotally mounted at 23 on the trolley and at 24 on a fixed point, this other arm extending substantially at right angles to the former by forming the extension of a radius of the gear ring 1 which intersects the axis of pinion 3. The function of this arm 22 is to hold the rollers 7d, 8d and 21d in engagement with the outer face of the two guide ribs 11 in spite of the effort produced by the relative meshing engagement of the pinion and gear ring which tends to move these meshing members away from each other.

Preferably, the damping arms 15 and 22 consist of hydraulic shock-absorbers and in this case a balance line 25 may be provided therebetween. Thus, the pressure generated by the hydraulic shock-absorber or arm 15 as a consequence of the tangential effort is transmitted to the other holding arm 22. These arms are so designed that the effort exerted by the arm 22 will constantly be slightly greater than the force tending to move the pinion away from the gear ring. Thus, the efforts to which the rollers are subjected may be reduced considerably and their useful life extended correspondingly.

The arrangement and number of guide rollers provided in the trolley supporting the driving pinion may vary considerably. However, in all cases, at least two rollers must be provided on either side of the mesial plane of meshing engagement between the pinion and gear ring. These rollers must be disposed either in the mesial plane of the gear ring and pinion, which extends at right angles to their axes, or on either side of this plane.

Thus, FIGS. 6 to 8 illustrate three typical forms of embodiment of the device of this invention, wherein the trolley comprises only rollers engaging tracks facing the center of the gear ring and preventing any outward movement of the pinion.

In the example illustrated in FIG. 6, the trolley 5e comprises only two rollers 9e and 10e disposed in the mesial plane of the gear ring and engaging an inner guide track 12e rigid with the gear ring 1e, these rollers being disposed on either side of the above-defined mesial plane of meshing engagement.

In the example shown in FIG. 7, the trolley 5f comprises two rollers 9f and 10f disposed on either side of the mesial plane of the gear ring 1f, and engaging guide tracks 12, 12a also disposed on either side of this plane. The rollers 9f and 10f are disposed on either side of the mesial plane of meshing engagement.

Figure 8A:
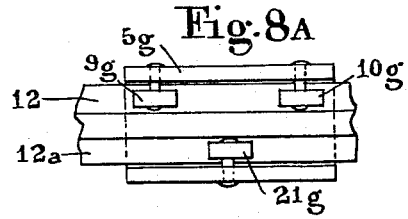
Figure 8B:
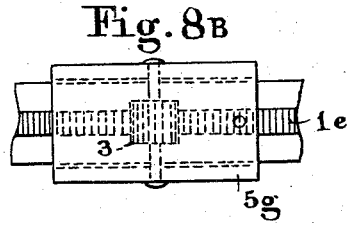

In the example illustrated in FIGS. 8A, 8B the trolley 5g carries three rollers 9g, 10g and 21g engaging a pair of guide tracks 12, 12a. The two rollers 9g and 10g engaging the track 22 register with one of the faces of the gear ring and are disposed on either side of the mesial plane of meshing engagement. The axis of the other roller 21g engaging the track 22a lies in this plane.

FIGURES 9A, 9B, 10A, 10B and 11A, 11B illustrate three different arrangements wherein the trolley comprises on the one hand rollers engaging tracks directed toward the center of the gear ring and rollers engaging tracks directed toward the outer periphery of the gear ring.

Figure 6A:
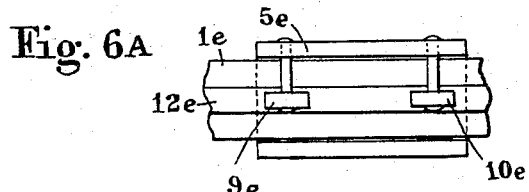
Figure 6B:
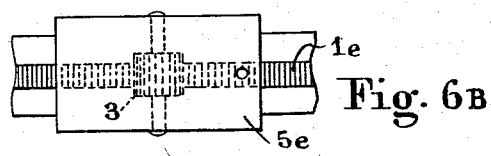
Figure 7A:
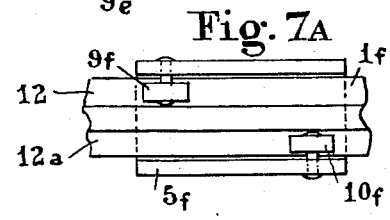
Figure 7B:
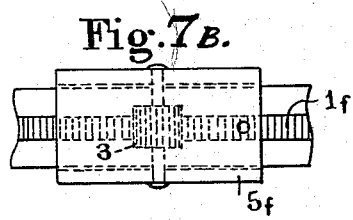
Figure 9A:
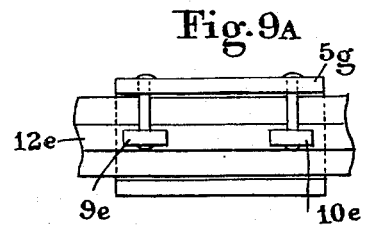
Figure 9B:
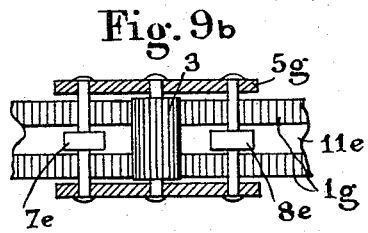

In the example of FIGS. 9A and 9B, the trolley 5h comprises on the inner side, like the trolley 5e of FIGS. 6A and 6B, a pair of rollers 9e, 10e engaging an inner intermediate track 12e disposed centrally of the teeth 1g of the gear ring. However, on the outer side, it comprises similarly two rollers 7e and 8e engaging a track 11e turned inwards and located in the mesial plane of the gear ring.

Figure 10A:
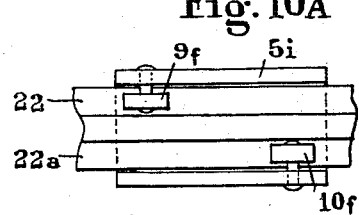
Figure 10B:
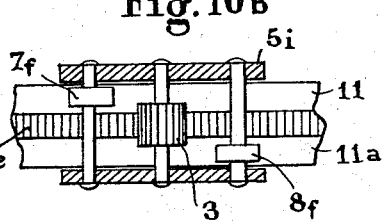

In the example illustrated in FIGS. 10A and 10B the trolley 5i comprises on the inner side (like the trolley 5f of FIGS. 7A and 7B) a pair of rollers 9f and 10f engaging a pair of inner tracks 22, 22a. On the outer side, it comprises two rollers 7f, 8f disposed on either side of the mesial plane of the gear ring and engaging a pair of outer tracks 11 and 11a, these last-named rollers being disposed on either side of the mesial plane of meshing engagement.

Figure 11A:
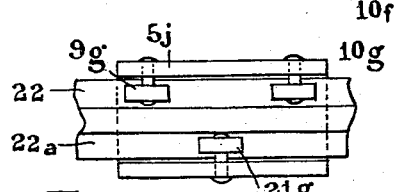
Figure 11B:
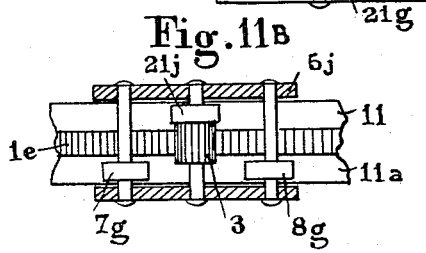
Figure 12A:
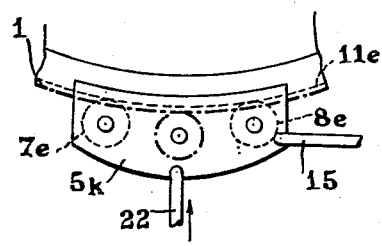
Figure 12B:
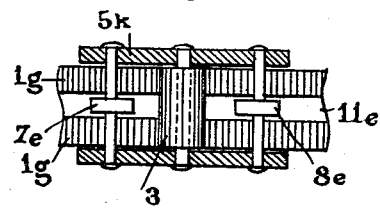
Figure 13A:
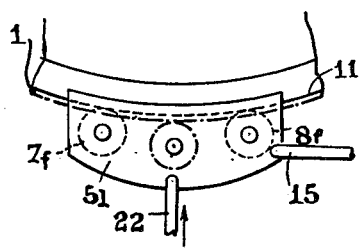
Figure 13B:
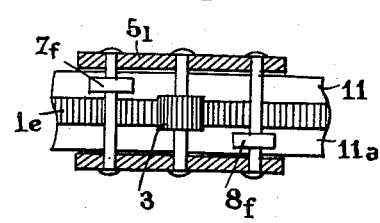
Figure 14A:
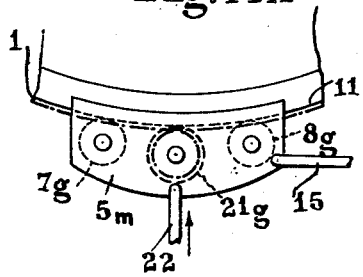
Figure 14B:
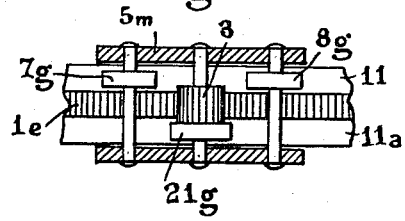

In the example illustrated in FIGS. 11A and 11B, the trolley 5j comprises on the inner side, like the trolley 5g of FIGS. 8A and 8B, three rollers 9g, 10g and 21g engaging a pair of inner tracks 12, 12a. On the outer side, it also comprises three rollers 7g, 8g and 21j constituting a similar but inverted arrangement, these rollers engaging a pair of outer tracks 11, 11a.

FIGS. 12A, 12B, 13A, 13B, 14A and 14B illustrate three typical embodiments wherein the trolley comprises only guide rollers engaging outer tracks of the gear ring, a bearing arm 22 similar to the one contemplated in the embodiment of FIG. 5 being provided to prevent any outward movement of the trolley in relation to the gear ring.

In the examples illustrated in these figures the number and arrangement of the rollers thus provided only on the outer side correspond respectively to the number and arrangement of the rollers provided on the outer side in the examples of FIGS. 9 to 11 (see notably FIGS. 9B to 11B).

In all its different possible forms of embodiment the device of this invention provides always the same essential features, that is, the possibility for the trolley to pivot silghtly and therefore, without creating any side strain, to absorb or accommodate any relative displacements between the trolley and the machine driven through the pinion mounted therein, these displacements resulting from elastic deformation caused either by the action of heat, or by out-of-roundness, or by the driven gear revolving untrue.

The trolley may also bear either against a dynamometric damping system or on a hydraulic or pneumatic ram, for imparting a certain torsional elasitcity to the transmission, or measuring the torque transmitted to the trolley so as to actuate adequate stop motions when an overload, a shock or a jamming occur which produce stress exceeding the permissible limits.

If desired, when a hydraulic ram is used for holding the trolley a transmission may be provided wherein, in addition to the normal drive of the gear ring from the power shaft through the driving pinion, this gear ring can be moved through a reduced angle and at low speed by actuating the ram by means of a suitable control circuit. In this case the ram actuation will cause the trolley to move, and the gear ring to move bodily therewith. This possibility of providing an additional drive may be particularly useful in certain specific applications. This combination is particularly advantageous in the case of a transmission device comprising a "floating" reducing gear mounted on the shaft of the driving pinion.

In these various forms of embodiment, the guide rollers of the trolley carrying the driving pinion may be replaced by shoes or similar members adapted to engage and follow the guide tracks.

FIGS. 15 to 17 illustrate a specific form of embodiment of the device of this invention, which is designed with a view to further increase the possibility of movement of the trolley 5n carrying the driving pinion 3. This device is particularly adapted for driving a gear ring 1n having a vertical shaft 26.

The trolley 5n has only one plate mounted above the gear ring 1n. At the side near the center of the gear ring this plate carries two guiding rollers, 9n, and 10n, which are in rolling engagement with the inner face of the rim 27 at a height corresponding with the median plane of the teeth. The rollers 9n and 10n are mounted for rotational movement on swivel joints 40. The outer face of the rim 27 carries the teeth 27n of the gear ring.

The trolley 5n is held stationary by means of a connecting bar 15n, coupled to the trolley through the medium of a universal joint 16n, and the other end of which is held stationary by means of another universal joint 20n. The connecting bar 15n may be devised to perform the function of a damper like that of the formerly described embodiments.

In conformity with the general character of this new embodiment, the trolley 5n is assembled with the driving mechanism of the pinion 3, and the whole structure is mounted in hanging arrangement on universal joints allowing a certain freedom of movement in all the directions.

In the example shown, the driving mechanism comprises a motor 29 actuating a speed reducing gear 30, for instance, a worm in meshing engagement with a wormwheel, the casing of which is mounted onto the upper side of the trolley 5n. The casing of the motor 29 stands on a small hollow base 31 attached to the upper side of the casing of the speed reducing gear 30, the center of gravity of the whole driving mechanism being located at the inside of the hollow base.

This whole structure is pivotally mounted on a universal joint 32 substantially located at the center of gravity. The universal joint comprises a ball integral with a vertically standing finger 33, attached to the upper side of the casing of the speed reducing gear, and a spherical socket integral with horizontal arms 34 which are attached to a yoke 35 straddling the motor 29. The upper end of the yoke is provided with a vertical arm 36, the free end of which is hanging from a stationary bracket 37 by means of an other universal joint 38.

In this arrangement the trolley 5n is able to move slightly in all directions, and to take automatically the position which is the most effective for the best meshing engagement between the pinion 3n and the ring gear 1n.

In fact, under the action of the stresses, the trolley 5n is able to pivot in all directions about the swivel joint 32, the yoke 35 and the arm 36 being in turn able to pivot about the universal joint 38. During these movements the ends of the connecting bar 15n may obviously pivot about the swivel joints 16n and 20n.

If desired, the ball joints 32, 38, 16n and 20n may be replaced by double universal or Hooke's joints, or by any other suitable universal coupling.

FIGS. 18 to 20 illustrate a specific form of embodiment wherein the device comprises two pinions 43, 43a driving the gear ring 41 carried by a shaft 42. Each driving pinion is trunnioned in a support 44 or 44a.

Each support is separate from the frame structure supporting the shaft 42 and constitutes somewhat a trolley mounted on the periphery of the gear ring 41 proper. To this end, each one of these two supports comprises shoes engaging one or several guide tracks carried by the outer periphery of the gear ring 41 and disposed concentrically to the gear ring teeth. Thus, in the example illustrated each support comprises four shoes of which only three are visible in the drawings, that is, shoes 45, 46 and 47 associated with support 44, and shoes 45a, 46a and 47a associated with support 44a. On each support the shoes are divided into two groups, these two groups being disposed on either side of the meshing plane between the relevant pinion 43 or 43a and the gear ring teeth. In each group, the two shoes are disposed on either side of these teeth, and contact the one a guide track 49 and the other a guide track 50, these two tracks being concentric to the gear ring teeth and disposed on either side thereof.

Each support 44 and 44a is connected to a fixed point 51 and 51a respectively through a coupling rod 52, or 52a pivoted at either ends 53, 54 (rod 52), or 53a, 54a (rod 52a).

The two supports 44 and 44a disposed along the outer periphery of gear ring 41 are diametrally opposite to each other. They are connected directly to each other through four tie-rods of which only three are visible in the drawings, that is, the tie-rods 57, 58 and 59. These tie-rods are divided into the two groups of two tie-rods each, and these groups are disposed on either side of the plane of meshing engagement of the pinions 43 and 43a with the teeth of gear ring 41. The two tie-rods of a same group are disposed on either side of this ring. Thus, the two tie-rods 57 and 58 of the first group are disposed on either side of ring 41. Similarly, the tie-rod 59 of the second group and the second tie-rod of the same group (which is not visible in the drawings) are disposed on either side of this ring.

The corresponding ends of the two tie-rods of a same group are pivotally mounted on a common rudder bar 55 or 56 on the side of support 44, and 55a or 56a on the side of support 44a. Each rudder bar is parallel to the axis of the corresponding driving pinion 43 or 43a. It bears through a projection 61 on a boss 61a formed on the corresponding support 44 or 44a, the projections 61 and bosses 61a being disposed substantially in the mesial plane x–x' of the teeth of the gear ring 41 and of the pinions 43 and 43a meshing therewith.

The aforesaid four tie-rods are pivoted directly on the rudders 55a and 56a reacting on the support 44a. On the other hand their opposite ends are pivotally mounted on the rudders 55 and 56 with the interposition of a spring. To this end, the corresponding end portion of each tie-rod, for example tie-rod 58 (see FIG. 20) comprises a head 63 disposed within an end socket 62 pivotally mounted about the rudder 55 or 56, the inlet aperture of this socket being closed by a screw plug 64, suitable spring means 66 being interposed between this plug and the head 63. These spring means 66 urge the tie-rods in such a way that these tie-rods constantly keep the shoes of the pair of supports 44, 44a in frictional engagement with the two guide tracks 49 and 50. The clearance d left in the inoperative condition between the adjacent surfaces of the head 63 of the tie-rods and the screw plug 64 corresponds to the permissible play between the shoes of the two supports in the direction away from each other as a result of the outward forces E and E' resulting from the relative meshing engagement between the pinions 43, 43a and the gear ring; in this case the springs are compressed home. Thus, the screw plug constitute adjustable stops whereby the compression of springs 66 can be limited as well as the relative spacing between the shoes and the guide tracks.

The pinions 43, 43a are each driven from a worm 67, 67a respectively, the case of these worms being rigid with the support 44 or 44a. These two reduction gears are interconnected through a shaft 68, suitable universal or Hooke's joints or like couplings being interposed therebetween. These reduction gears are driven from a shaft 69.

If the differences in clearance between the assemblies formed by each reduction gear and the relevant pinion is such that the pinion movement, in relation to the center of the gear ring, of a value equal to half the clearance d of the tie-rods, is not sufficient to compensate or equalize the outward forces E and E', the tangential efforts T and T' and therefore the outward forces E and E' may be compensated by simply providing axial resilient means in the coupling rods 52 and 52a.

The device illustrated in FIGS. 21 to 23 comprises a toothed gear ring 71 carried by a shaft 72 and driven by a set of three pinions 73, 73a and 73b in contstant meshing engagement with the gear ring teeth. Each pinion is trunnioned in a support 74, 74a, 74b similar to the supports 44 and 44a of the preceding form of embodiment. Each support constitutes a kind of trolley separate from the frame structure supporting the gear ring 71, this trolley being mounted nevertheless on the outer periphery of the gear ring. To this end, each support comprises four rollers engaging a pair of corresponding guide tracks 79, 80. These rollers are substituted for the shoes contemplated in the preceding form of embodiment, but their relative arrangement on each support is exactly the same. In the drawings, only the rollers 75, 76 and 77 of support 74, the rollers 75a, 77a of support 74a, and the rollers 75b, 76b, 77b of support 74b are visible.

Each support is connected to a fixed point 81, 81a, 81b respectively by means of a coupling rod 82, 82a, 82b pivoted at either ends by means of pins 83 and 84 in a manner similar to the arrangement of supports 44 and 44a of the preceding form of embodiment.

The three supports 74, 74a and 74b are disposed at spaced intervals around the periphery of the gear ring 71 (see FIG. 21). They are interconnected through pivoted tie-rods similar to those already described hereinabove. However, in this case these tie-rods do not provide a direct connection between the supports. In fact, this connection is obtained through a pair of rings 97, 98 disposed each on one side of the gear ring 71, the center of these rings 97, 98 being coincident with the axis of shaft 72 in the inoperative position.

Each support is connected to these two rings through four tie-rods pivoted at their ends. These tie-rods are arranged and disposed like those of the preceding form of embodiment which are mounted on supports 44 and 44a. Thus, on the support 74 four tie-rods are mounted, but only three of them, namely tie-rods 87, 88 and 89 are visible in the drawings. The two groups of tie-rods are disposed on either side of the plane of relative meshing engagement of the pinion 73 and gear ring 71. In each group one of the tie-rods is disposed on one side of the gear ring, and the other tie-rod on the other side. Thus, tie-rod 87 is pivoted at 100 on the ring 97, and tie-rod 88 is pivoted at 101 on the opposite ring 98. Regarding the tie-rod 89 of the second group, it is pivoted at 102 on ring 97, and the fourth tie-rod (not visible in the figures) is pivoted on ring 98.

The same applies to the four tie-rods of the other pair of supports, of which only tie-rods 87a, 89a and 87b, 89b, 90b are visible in the figures.

The pivotal connection of each tie-rod on the corresponding 97 or 98 is obtained through a ball-and-socket device of which one (corresponding to tie-rod 87) is shown in detail in FIG. 23. As will be seen from this figure, the end portion of the tie-rod is formed with an aperture 103 having part-spherical walls, this aperture being engaged by a member 104 also formed with part-spherical walls, to constitute a kind of ball joint. This member is carried by a bolt 105 secured in a hole formed in the relevant ring 97 at the location contemplated for the corresponding pivotal connection, that is, at 100. Thus, the tie-rods are adapted to swivel in all directions in relation to the intermediate connecting rings 97 and 98.

The end of the tie-rods which is opposite to ring 97 or 98 is pivotally mounted on a rudder-like member interconnecting the two tie-rods of a same group, that is, a rudder 95, 96, 95a, 96a, 95b, 96b. Each rudder bears through a projection 91 on a boss 91a formed on the corresponding pinion support, substantially in the mesial plane x–x' of the pinion and gear ring teeth.

The tie-rods are mounted on the rudders with the interposition of a spring as in the preceding form of embodiment. The action of these different springs tends to urge the rollers of the different pinion supports against the two guide tracks 79 and 80. In the inoperative position a certain play d is provided between the adjacent faces of each screw plug 94 and the head 93 of the tie-rods. During the operation of the device, this play is reduced to zero, as already explained in connection with the preceding form of embodiment.

Also as in this preceding form of embodiment, the various pinion carriers of the present device are adapted to accommodate the different defects likely to occur in the gear ring or in the gear ring teeth by swivelling in order to enable the teeth of each pinion to bear with their full width on the gear ring teeth. Thus, this device ensures a proper meshing engagement between the different pinions and the gear ring.

The number of driving pinions may be greater than three, and in this case the corresponding supports or carriers would be disposed at spaced angular intervals around the outer periphery of the gear ring and interconnected through mounting rings disposed on either side of the gear ring, as in the case of the device illustrated in FIGS. 21 to 23. On the other hand, the arrangement and number of shoes, rollers or other equivalent means may be modified, if desired, provided that in each pinion carrier these members are disposed on either side of the plane of meshing engagement between the relevant pinion and the gear ring. Moreover, instead of two guide tracks disposed on either side of the gear ring, a single guide track may be provided substantially in the mesial plane of the gear ring teeth, for instance in the middle of these teeth. In this case, each pinion carrier will comprise only two rollers, shoes or equivalent means, mounted for engagement with the surface of this single guide track and disposed or distributed on either side of the plane of meshing engagement between the corresponding pinion and the gear ring. But in these various arrangements, involving the driving of the gear ring by means of a plurality of pinions having their carriers interconnected by tie-rods, the gear ring carries only one or two guide tracks facing outwards, and each carrier has only shoes, rollers or equivalent means engaging said outer track or tracks.

What I claim is:

1. An arrangement of the character described comprising, in combination, a rotary gear ring having a toothed peripheral portion and at least one guide track concentric to said peripheral portion and symmetrically arranged with respect to a plane of symmetry of the gear ring normal to the axis thereof, supporting means, a driving pinion rotatably mounted in said supporting means and in meshing engagement with said toothed peripheral portion, means for driving said pinion, at least two spaced guide members mounted on said supporting means on either side of the plane passing through the axes of driving pinion and gear ring, said members engaging said guide track on opposite sides of a transverse mesial plane of said driving pinion extending normal to the axis thereof, a rod for holding said supporting means against tangential movements in relation to said toothed peripheral portion, the axis of said rod intersecting the transverse mesial plane of said driving pinion normal to the axis thereof and the end portions of said rod being attached for universal tilting movement to said supporting means and to a fixed point respectively.

2. An arrangement as set forth in claim 1, wherein said holding rod consists of a damping device.

3. An arrangement of the character described, comprising in combination a rotary gear ring comprising a toothed periphreal portion and first and second guide tracks concentric to said peripheral portion and having a surface facing the center of said gear ring, said guide tracks being disposed on either side of the plane of symmetry of said gear ring normal to the axis thereof, supporting means, a driving pinion rotatably mounted in said supporting means and in meshing engagement with said toothed peripheral portion of the gear ring, means for driving said pinion, at least two spaced guide members mounted on said supporting means on either side of the plane passing through the axes of driving pinion and gear ring, one of said spaced guide members engaging the first guide track and the other the other guide track, a rod for holding said supporting means against tangential movements in relation to said toothed peripheral portion, the axis of said rod intersecting the transverse mesial plane of said driving pinion normal to the axis thereof and the end portions of said rod being attached for universal tilting movement to said supporting means and to a fixed point respectively.

4. An arrangement of the character described which comprises in combination a rotary gear ring formed with a toothed outer peripheral portion and a guide track concentric to said portion which has a surface facing outwards and extends substantially on either side of the plane of symmetry of said gear ring normal to the axis thereof, supporting means, a driving pinion rotatably mounted in said supporting means and in meshing engagement with said toothed peripheral portion, means for driving said pinion, at least two spaced guide members mounted on said supporting means on either side of the plane passing through the axes of driving pinion and gear ring, said members engaging said guide track, a rod for holding said supporting means against tangential movements in relation to said toothed peripheral portion, the axis of said rod intersecting the transverse mesial plane of said driving pinion normal to the axis thereof and the end portions of said rod being attached for universal tilting movement to said supporting means and to a fixed point respectively, means for holding said supporting means against movement in relation to said rotary gear ring in the radial direction within predetermined limits.

5. An arrangement as set forth in claim 4, wherein said means for holding said supporting means against movement in the radial direction consist of a damping arm having its ends pivotally mounted on said supporting means and on a fixed point respectively through pivot means affording a certain freedom of movement in all directions.

6. An arrangement of the character described, comprising in combination a rotary gear ring comprising a toothed peripheral portion and first and second guide tracks having each a surface concentric to said toothed peripheral portion, said guide tracks facing outwards and being disposed on either side of the plane of symmetry of said gear ring normal to the axis thereof, supporting means, a driving pinion rotatably mounted in said supporting means and in meshing engagement with said toothed peripheral portion of the gear ring, means for driving said pinion, three spaced guide members mounted on said supporting means, two of said spaced guide means which are disposed on either side of the plane passing through the axes of driving pinion and gear ring engaging one of said two guide tracks, the third spaced guide member being mounted in said plane passing through the axes of driving pinion and gear ring and engaging the second guide track, a rod for holding said supporting means against tangential movements in relation to said toothed peripheral portion, the axis of said rod intersecting the transverse mesial plane of said driving pinion normal to the axis thereof and the end portions of said rod being attached for universal tilting movement to said supporting means and to a fixed point respectively, means for holding said supporting means against movement in relation to said rotary gear ring in the radial direction within predetermined limits.

7. An arrangement as set forth in claim 6, wherein said means for holding said supporting means against movement in the radial direction consist of a damping arm having its ends pivotally mounted on said supporting means and on a fixed point respectively through pivot means affording a certain freedom of movement in all directions.

8. An arrangement of the character described, comprising in combination a rotary gear ring formed with a toothed peripheral portion and first and second guide tracks concentric to said portion, one track having a surface facing the center of the gear ring and the other track having a surface facing outwards, both guide tracks extending on either side of the plane of symmetry of said gear ring normal to the axis thereof, supporting means, a driving pinion rotatably mounted in said supporting means and in constant meshing engagement with said toothed peripheral portion, means for driving said pinion, four spaced guide members mounted in said supporting means and divided into two pairs engaging said first and second guide tracks respectively, the two guide members of each pair being disposed on either side of the plane passing through the axes of driving pinion and gear ring, a rod for holding said supporting means against tangential movements in relation to said toothed peripheral portion, the axis of said rod intersecting the transverse mesial plane of said driving pinion normal to the axis thereof and the end portions of said rod being attached for universal tilting movement to said supporting means and to a fixed point respectively.

9. An arrangement of the character described, comprising in combination a rotary toothed gear ring comprising a toothed peripheral portion and four guide tracks concentric to said portion and divided into two pairs, namely a first pair of inner guide tracks having each a surface facing the center of said gear ring and another pair of outer guide tracks having each a surface facing outwards, the two tracks of each pair being disposed on either side of the plane of symmetry of said gear ring normal to the axis thereof, supporting means, a driving pinion rotatably mounted in said supporting means and in constant meshing engagement with said toothed peripheral portion, means for driving said pinion, three inner spaced guide members of which two are mounted on either side of the plane passing through the axes of driving pinion and gear ring, said two inner guide members engaging one of said inner guide tracks while the third guide member located substantially in said plane passing through the axes of driving pinion and gear ring engages the other inner guide track, three outer spaced guide members of which two are also mounted on either side of the plane passing through the axes of driving pinion and gear ring, said two outer guide members engaging one of said outer guide tracks while the third guide member located substantially in said plane passing through the axes of driving pinion and gear ring engages the other outer guide track, a rod for holding said supporting means against tangential movements in relation to said toothed peripheral portion, the axis of said rod intersecting the transverse mesial plane of said driving pinion normal to the axis thereof and the end portions of said rod being pivotally attached to said supporting means and to a fixed point respectively.

10. An arrangement of the character described, comprising in combination a rotary gear ring comprising a toothed peripheral portion and a guide track concentric to said portion which has a surface facing the center of said gear ring and extends on either side of the plane of symmetry of said gear ring normal to the axis thereof, first supporting means, a driving pinion rotatably mounted in said first supporting means and in constant meshing engagement with said peripheral portion, means for driving said pinion which are rigidly mounted on said first supporting means, other supporting means comprising a first universal joint of the ball-and-socket type to which said first supporting means are pivotally connected another fixed universal joint carrying said other supporting means, two spaced guide members mounted in said first supporting means and disposed on either side of the plane passing through the axes of driving pinion and gear ring, said spaced guide members engaging said guide track, a rod for holding said first supporting means against movement in a tangential direction in relation to said peripheral portion, the axis of said rod being coincident with the mesial transverse plane of said driving pinion normal to the axis thereof, the end portions of said rod being mounted on said first supporting means and on a fixed point respectively through the medium of universal joints.

11. An arrangement of the character described, comprising in combination a rotary gear ring comprising a toothed peripheral portion and at least one guide track concentric to said peripheral portion, at least two spaced supporting means disposed along said peripheral portion, at least two driving pinions rotatably mounted in one and the other of said supporting means and in meshing engagement with said toothed peripheral portion, on each of said supporting means at least a pair of guide members disposed on either side of the plane passing through the axes of driving pinion and gear ring mounted in said corresponding supporting means, said two guide means engaging said guide track, a rod on each of said supporting means for holding said means against tangential movements in relation to said toothed peripheral portion, the axis of said rod passing through the mesial plane of said the corresponding driving pinion normal to the axis thereof, the ends of said rod being mounted on one of said supporting means and on a fixed point respectively through universal joint means, at least two tie-rods interconnecting said two supporting means so as to hold them against radial movements in relation to said peripheral portion, the ends of said tie-rods comprising pivot means.

12. An arrangement of the character described, comprising in combination a rotary gear ring comprising a toothed peripheral portion and at least one guide track concentric to said peripheral portion, two spaced supporting means disposed along said peripheral portion, two driving pinions rotatably mounted in one and the other of said supporting means and in meshing engagement with said toothed peripheral portion, on each of said supporting means at least a pair of guide members disposed on either side of the plane passing through the axes of driving pinion and gear ring mounted in said corresponding supporting means, said two guide means engaging said guide track, a rod on each of said supporting means for holding said means against tangential movements in relation to said toothed peripheral portion, the axis of said rod passing through the mesial plane of said the corresponding driving pinion normal to the axis thereof, the ends of said rod being mounted on one of said supporting means and on a fixed point respectively through universal joint means, four tie-rods interconnecting said two supporting means and divided into two pairs disposed on either side of said toothed gear ring and into two groups disposed on either side of the diametral plane passing through the axes of said two driving pinions respectively, the relevant ends of the two tie-rods of a same group being pivotally mounted on a rudder extending normally parallel to the axis of the driving pinion of the corresponding supporting means and bearing against said supporting means at a point located substantially in the mesial transverse plane of the relevant driving pinion normal to the axis thereof.

13. An arrangement of the character described comprising, in combination a rotary gear ring comprising a toothed peripheral portion and at least one guide track concentric to said peripheral portion, at least three supporting means disposed along said peripheral portion, at least three driving pinions rotatably mounted in said supporting means respectively and in constant meshing engagement with said peripheral portion, on each of said supporting means at least a pair of guide members disposed on either side of the plane passing through the axes of driving pinion and gear ring mounted in said corresponding supporting means, said two guide means engaging said guide track, a rod on each of said supporting means for holding said means against tangential movements in relation to said toothed peripheral portion, the axis of said rod passing through the mesial plane of said the corresponding driving pinion normal to the axis thereof, the ends of said rod being mounted on one of said supporting means and on a fixed point respectively through universal joint means, for each supporting means at least two tie-rods disposed on either side of said gear ring and having one end bearing against the corresponding supporting means, two connecting members disposed on either side of said gear ring, said supporting means engaging tie-rods being pivotally mounted on said connecting members.

14. An arrangement of the character described comprising, in combination a rotary gear ring comprising a toothed peripheral portion and at least one guide track concentric to said peripheral portion, at least three supporting means disposed along said peripheral portion, at least three driving pinions rotatably mounted in said supporting means respectively and in constant meshing engagement with said peripheral portion, on each of said supporting means at least a pair of guide members disposed on either side of the plane passing through the axes of driving pinion and gear ring mounted in said corresponding supporting means, said two guide means engaging said guide track, a rod on each of said supporting means for holding said means against tangential movements in relation to said toothed peripheral portion, the axis of said rod passing through the mesial plane of said the corresponding driving pinion, the ends of said rod being mounted on one of said supporting means and on a fixed point respectively through universal joint means, for each one of said supporting means at least four tie-rods divided into two pairs disposed on either side of the toothed gear ring and into two groups disposed on either side of the plane passing through the axes of driving pinion and gear ring mounted in the corresponding supporting means, the ends of the two tie-rods of a same group being pivotally mounted on a rudder normally parallel to the axis of said driving pinion of the relevant supporting means, said rudder bearing against said supporting means at a point located substantially in the transverse mesial plane of the corresponding driving pinion normal to the axis thereof, two connecting members disposed on either side of said gear ring, said supporting means engaging tie-rods being pivotally mounted on said connecting means.

References Cited by the Examiner

UNITED STATES PATENTS

| 1,508,097 | 9/24 | Hassler | 74—587 |
| 2,832,229 | 4/58 | Rieser | 74—421 |

FOREIGN PATENTS 742,840   12/43   Germany.

DON A. WAITE, *Primary Examiner.*